US011406053B1

(12) United States Patent
Hu et al.

(10) Patent No.: US 11,406,053 B1
(45) Date of Patent: Aug. 9, 2022

(54) USING CASUAL LEARNING ALGORITHMS TO ASSIST IN AGRICULTURAL MANAGEMENT DECISIONS

(71) Applicant: CLIMATE LLC, San Francisco, CA (US)

(72) Inventors: Jie Hu, San Francisco, CA (US); Carlos J. Carrion Madera, San Francisco, CA (US)

(73) Assignee: CLIMATE LLC, San Francisco, CA (US)

( * ) Notice: Subject to any disclaimer, the term of this patent is extended or adjusted under 35 U.S.C. 154(b) by 584 days.

(21) Appl. No.: 16/418,634

(22) Filed: May 21, 2019

Related U.S. Application Data

(60) Provisional application No. 62/674,521, filed on May 21, 2018.

(51) Int. Cl.
    *G06F 7/48*      (2006.01)
    *A01B 79/02*     (2006.01)
    *G06Q 50/02*     (2012.01)
    *G06N 20/00*     (2019.01)
    *G06N 7/00*      (2006.01)

(52) U.S. Cl.
    CPC .......... *A01B 79/02* (2013.01); *G06N 7/005* (2013.01); *G06N 20/00* (2019.01); *G06Q 50/02* (2013.01)

(58) Field of Classification Search
    CPC ..................................................... A01B 79/02
    USPC ............................................................ 703/6
    See application file for complete search history.

(56) References Cited

U.S. PATENT DOCUMENTS

| 2016/0224703 | A1* | 8/2016 | Shriver | G06Q 10/0631 |
|---|---|---|---|---|
| 2017/0332544 | A1* | 11/2017 | Conrad | G06N 20/00 |
| 2018/0349520 | A1* | 12/2018 | Bhalla | G06Q 10/0631 |
| 2019/0012749 | A1* | 1/2019 | Jawaharlal | G06Q 10/0631 |

* cited by examiner

*Primary Examiner* — Timothy A Mudrick
(74) *Attorney, Agent, or Firm* — Harness, Dickey & Pierce, P.L.C.

(57) ABSTRACT

In one embodiment, a computer-implemented method includes receiving digital field data from an agricultural field representing one or more parameters of the field, soil, or crops in the field; retrieving historical data for the same field from one or more field databases; training and/or applying machine learning models to the field data and the historical data to derive representations of causality of one or more agronomic processes pertaining to the field; receiving user input specifying an anomaly to address via treatment, application or experiment; automatically adjusting the treatment, application or experiment to create a modified treatment, application or experiment that is most likely to generate result data that is usable to train machine learning models in an optimal manner.

20 Claims, 13 Drawing Sheets

Fig. 2
(a)
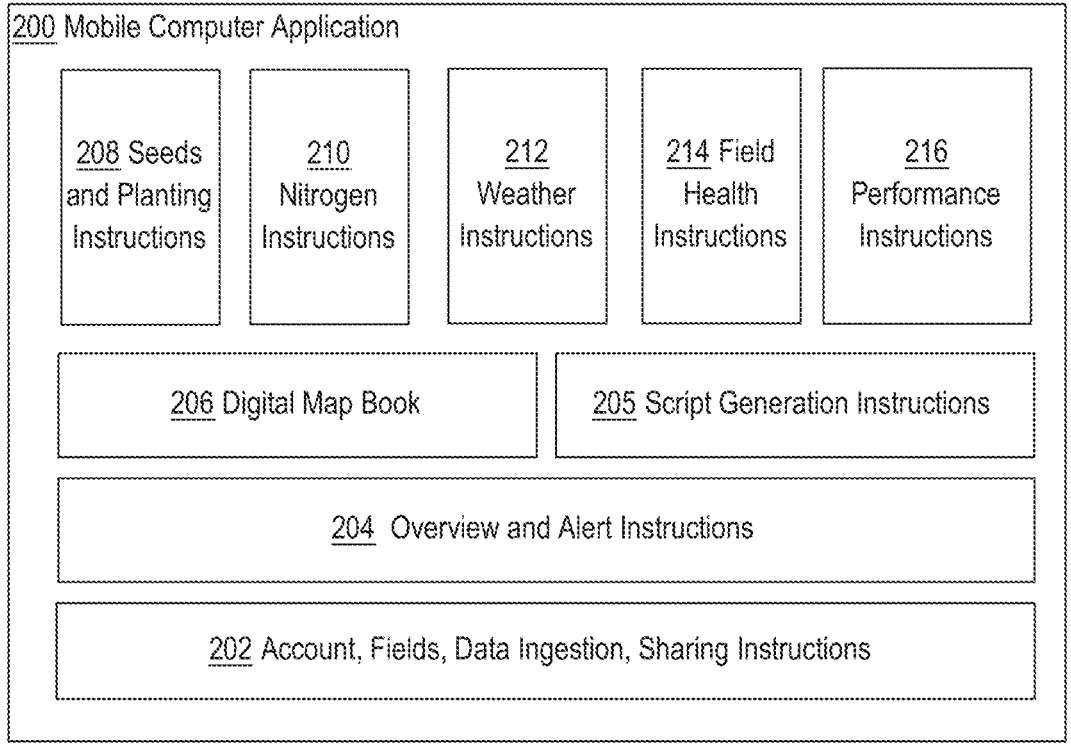
(b)
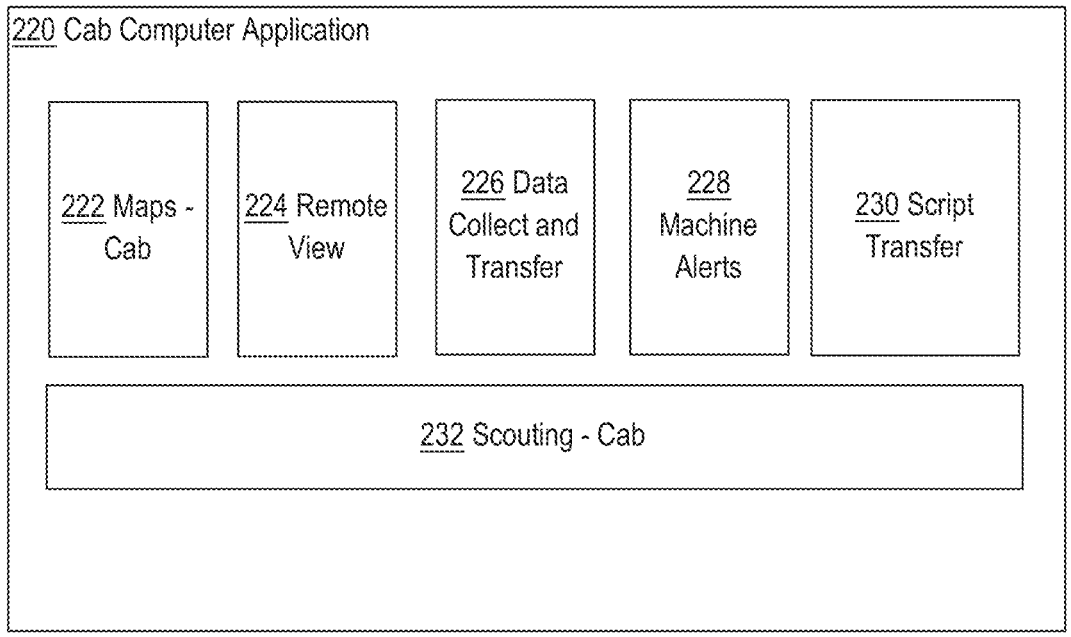

FIG. 5

Data Manager

| Nitrogen | Planting | Practices | Soil |

Planting 1(4 Fields)
Crop Corn Product
Plant Date: 2016-04-12
ILU 112 | Pop: 34000
[Edit] [Apply]

Planting 2(0 Fields)
Crop Corn Product
Plant Date: 2016-04-15
ILU 83 | Pop: 34000
[Edit] [Apply]

Planting 3(0 Fields)
Crop Corn Product
Plant Date: 2016-04-13
ILU 83 | Pop: 34000
[Edit] [Apply]

Planting 4(1 Fields)
Crop Corn Product
Plant Date: 2016-04-13
ILU 112 | Pop: 34000
[Edit] [Apply]

+ Add New Planting Plan

| | | CROP | PLANTED ACRES | PRODUCT | RELATIVE MATURITY | TARGET YIELD | POPULATION(AVG) | PLA |
|---|---|---|---|---|---|---|---|---|
| ☐ | Select All | | | | | | | |
| ☐ | Ames, IA 1<br>Corn \| 100 \| Boone, IA | Corn | — | DMC82-M | 112 | 160 | 34000 | Apr |
| ☐ | Austin, MN 1<br>Corn \| 100 \| Fredricks, MN | Corn | — | DMC82-M | 114 | 160 | 36000 | Apr |
| ☐ | Boone, IN 1<br>Corn \| 100 \| Boone, IA | Corn | — | DMC82-M | 112 | 150 | 34000 | Apr |
| ☐ | Champaign 1<br>Corn \| 100 \| Champaign, IL | Corn | — | — | 112 | 200 | 34000 | Apr |
| ☐ | E Nebraska 1<br>Corn \| 100 \| Burt, NE | Corn | — | — | 112 | 160 | 34000 | Apr |

FIG. 6

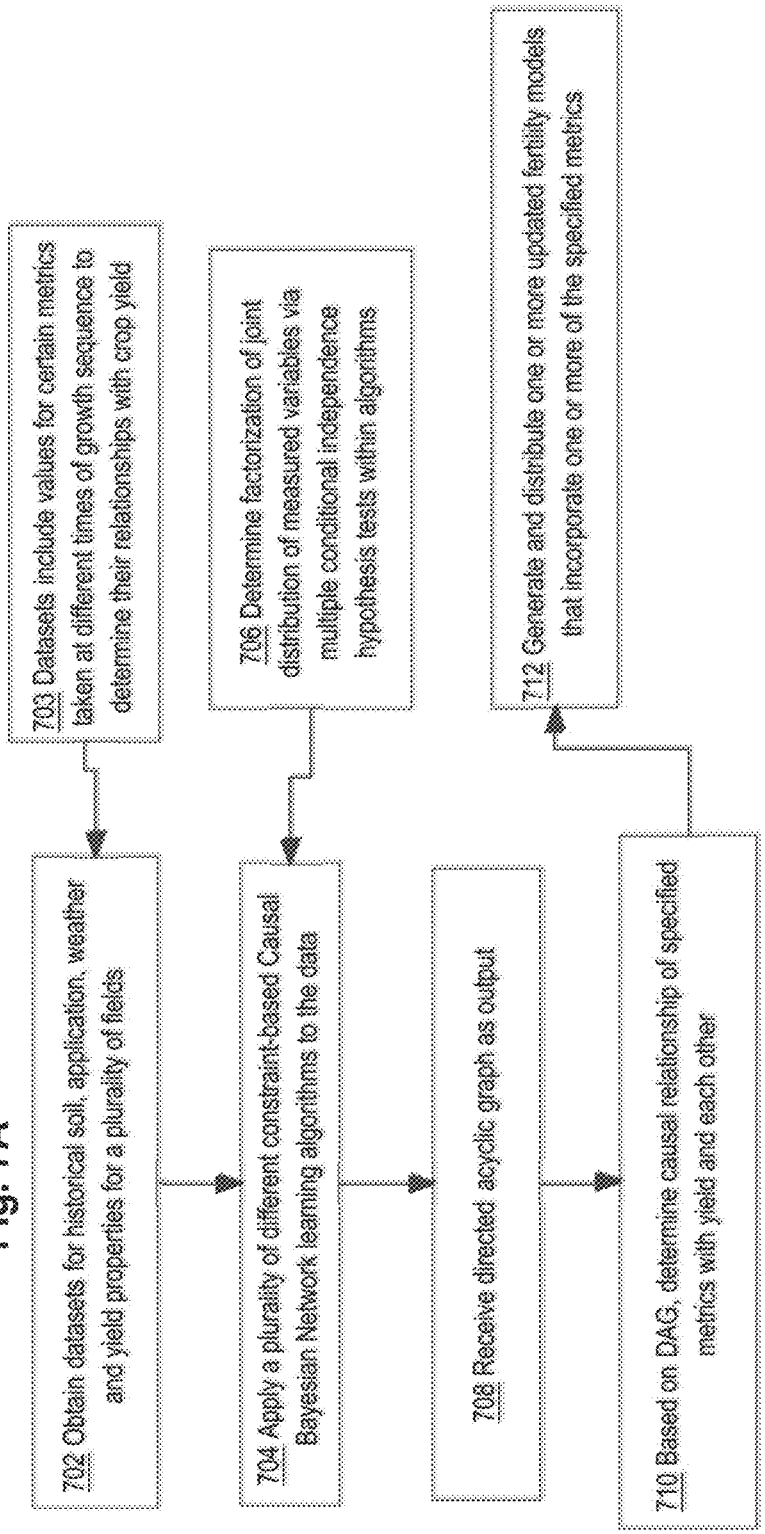

Fig. 7A

702 Obtain datasets for historical soil, application, weather and yield properties for a plurality of fields 703 Datasets include values for certain metrics taken at different times of growth sequence to determine their relationships with crop yield 704 Apply a plurality of different constraint-based Causal Bayesian Network learning algorithms to the data 706 Determine factorization of joint distribution of measured variables via multiple conditional independence hypothesis tests within algorithms 708 Receive directed acyclic graph as output 710 Based on DAG, determine causal relationship of specified metrics with yield and each other 712 Generate and distribute one or more updated fertility models that incorporate one or more of the specified metrics

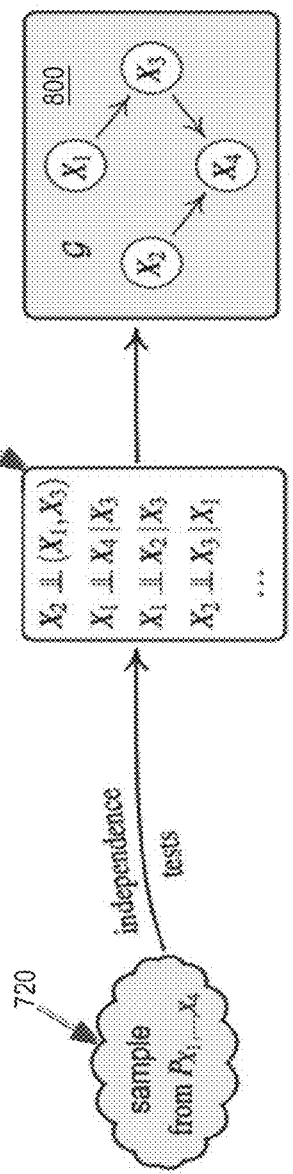

Fig. 7B

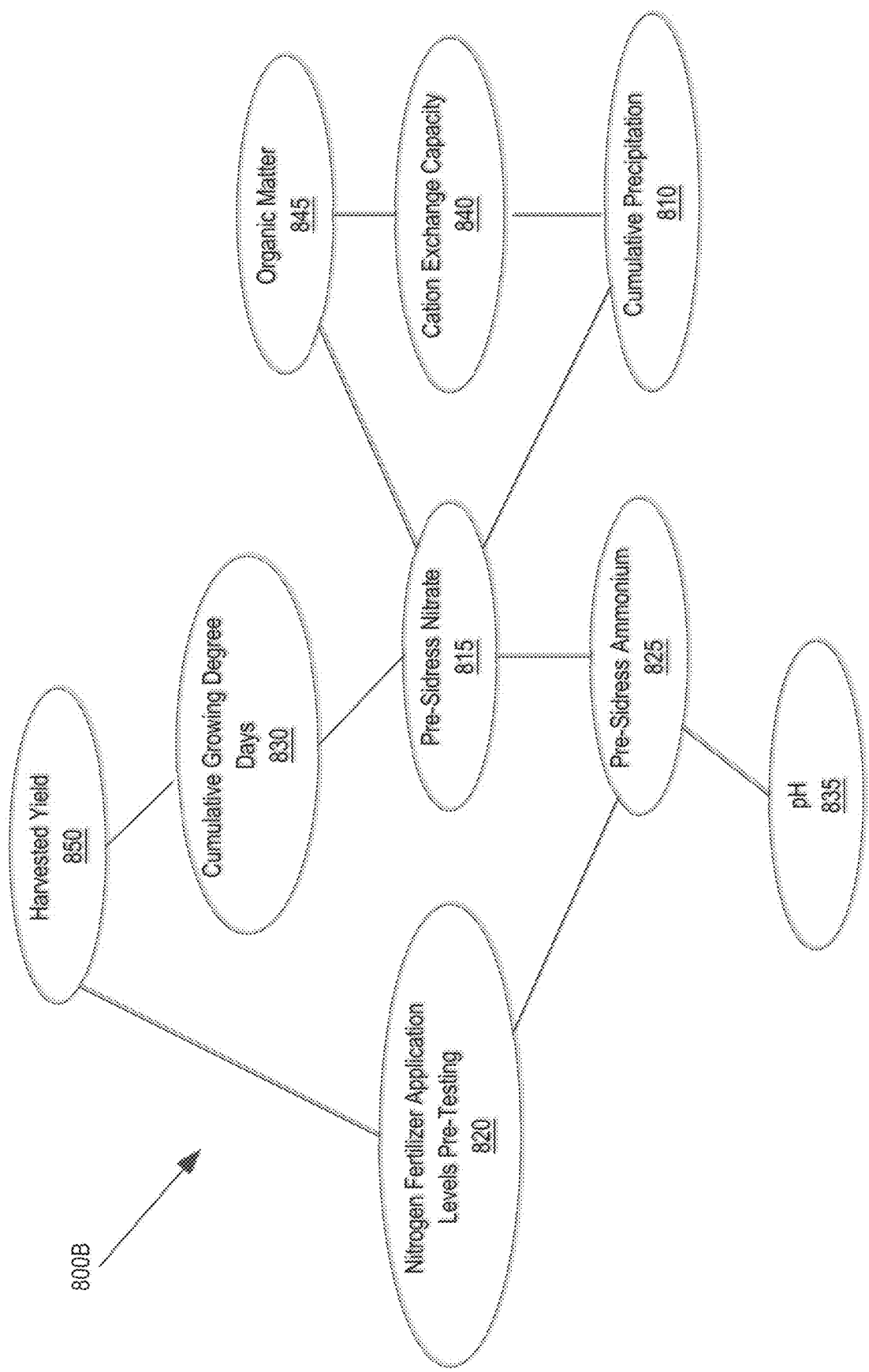

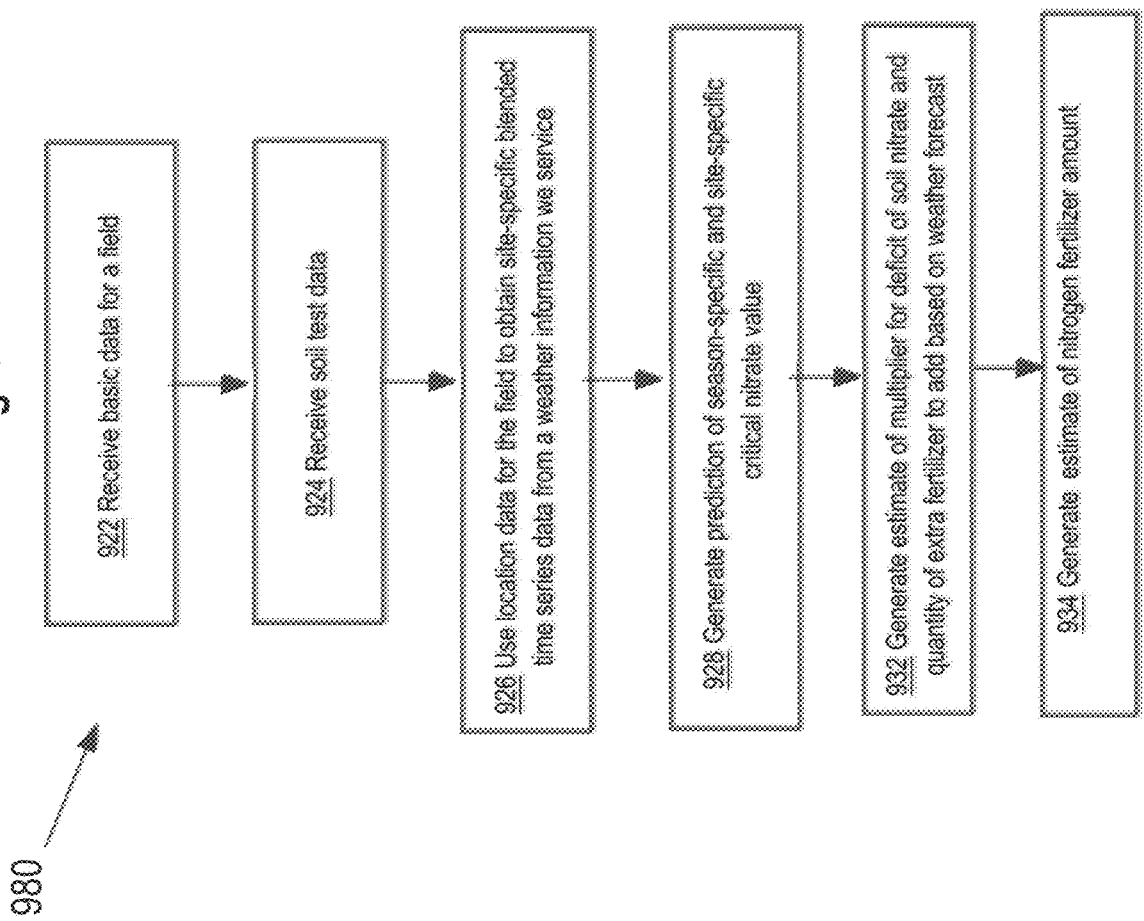

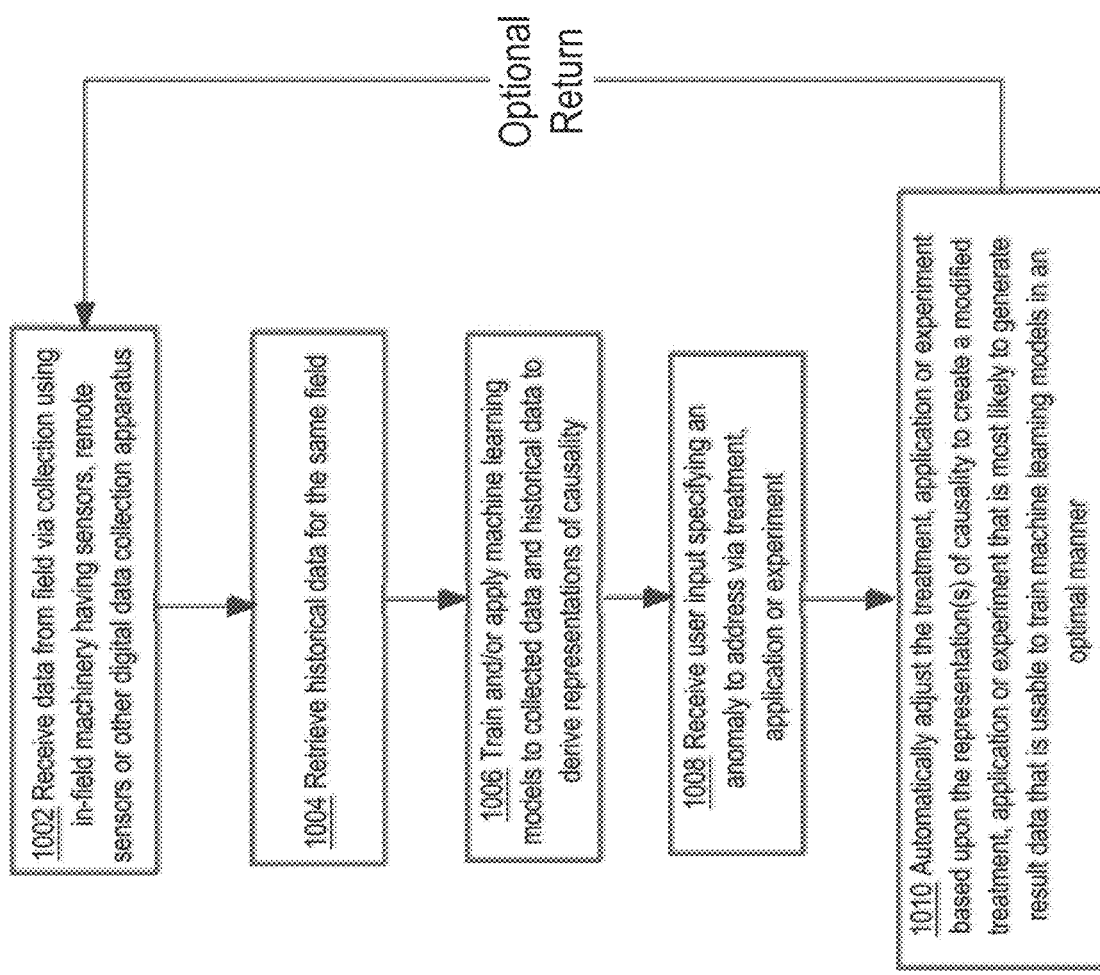

United States Patent US 11,406,053 B1

USING CASUAL LEARNING ALGORITHMS TO ASSIST IN AGRICULTURAL MANAGEMENT DECISIONS

BENEFIT CLAIM

This application claims the benefit of priority under 35 U.S.C. § 119 from provisional application 62/674,521, filed May 21, 2018, the entire contents of which is hereby incorporated by reference as if fully set forth herein. The applicants hereby rescind any disclaimer of claim scope in the priority applications or the prosecution history thereof and advise the USPTO that the claims in this application may be broader than any claim in the priority applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2017 The Climate Corporation.

FIELD OF THE DISCLOSURE

One technical field of the present disclosure is computer-assisted agriculture. Another technical field is artificial intelligence and machine learning algorithms, as implemented in computer programs. The disclosure relates more specifically to computer-implemented techniques for determining causal relationships between agricultural applications, crop characteristics, certain soil characteristics and/or crop yield at end of season, using machine learning methods, as a basis for determining where to place agricultural applications to result in improving computer-implemented machine learning models for recommending management practices for agricultural fields. The disclosure also relates to the use of soil testing in validating crop process models or nitrogen recommendation models, including whether the pre-sidedress nitrate test (PSNT) is useful in such models.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In computer-implemented agriculture, determining when field management practices cause a particular yield outcome, in the scientific sense of "cause" as opposed to merely having a correlation with that outcome, typically is problematic. One technical problem in this field is, given a list of variables from management practices, soil measurements, and harvested yield, how to determine which relationships are causal and not just correlations. The issue is important in agriculture because causal relationships may allow prescribing policies or actions that translate to actual results in terms of yield, and may allow designing and executing more insightful experiments by computer.

One specific area of interest is in-season nitrogen sidedress, which is one of the most efficient ways to manage nitrogen for a farm, since nitrogen fertilizers are added at a time when the crops need the nitrogen most. However, often growers do not know whether they need to sidedress, or how much nitrogen fertilizer should be added, especially on high organic matter fields, manured fields and fields with cover crops. The problem is complex because it is difficult to estimate what quantity of manure, cover crop residual vegetation, or high organic matter has converted to soil nitrate (N) in season, and whether the N level is high enough for crops to reach maximum yield. As a result, nitrogen fertilizers may be applied when they are not needed, and growers profit less due to the cost of over-application.

Binford et al, (1992) studied the relationship between crop yields and the pre-sidedress nitrate test (PSNT) in late spring and estimated the critical nitrate concentration of 25 ppm with 0.95 confidence interval of 23 to 26 ppm for the top foot of soil depth. They found yield is not responsive to PSNT when the PSNT result is greater than 25 ppm. Based on this result, Iowa State University recommended growers from Iowa if soil nitrate-N is greater than the critical nitrate, then no sidedress is needed since the soil has adequate soil-nitrate for crops to reach the maximum yield, otherwise, sidedress is recommended and each unit of soil nitrate-N in ppm deficit requires 8 in pounds per acre nitrogen fertilizer. This approach was adopted by other states and each state adjusted the critical nitrate level slightly recognizing it varies from state to state.

Binford and the Iowa recommendations represent theory, but in practice, PSNT-based sidedress recommendations are difficult. Measurement is subject to measurement errors due to insufficient sampling and lack of knowledge on where to sample. Lab tests may require several days and this waiting period may cost growers the opportunity to sidedress or make this approach too inconvenient to adopt. The critical nitrate level varies widely based on geography and also among fields in the same region and in different years. In addition, the amount of fertilizers to be added depends on the local weather and soil conditions. In sum, while PSNT may be commonly used, its value as a component of crop process models or N recommendation models has not been considered in the past.

Thus, there is a long-standing need for a solution to in-season nitrogen management. Effective solutions could encourage growers to utilize bio-fertilizers and crop rotations to manage nutrients. In the last century, trends have pointed to less diversified crop rotations, separating crop production from animal enterprises and increasing use of manufactured N fertilizers. However, better prediction tools could drive a return to using naturally occurring or biologic fertilizers rather than manufactured products, which is expected to have significant environmental benefits and cost advantages. Furthermore, there is a need for better ways to identify causal relationships in the field so that applications, treatments or experiments can be deployed in the field to provide response data or result data that can be used to train machine learning models for recommendations more effectively.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 5 depicts an example embodiment of a timeline view for data entry.

FIG. 6 depicts an example embodiment of a spreadsheet view for data entry.

FIG. 7A illustrates a method or an algorithm for determining causal relationships between specified soil tests and other data in crop development.

FIG. 7B illustrates data flow in applying the algorithms of FIG. 7A.

FIG. 8A, FIG. 8B, and FIG. 8C illustrate example acyclic directed graphs as possible output from using the method of FIG. 7A.

FIG. 9B illustrates a process of using the system of FIG. 9A.

FIG. 10 illustrates a process of determining the deployment of treatments, applications or experiments to provide response data that more effectively trains machine learning models.

DETAILED DESCRIPTION

Figure 1:
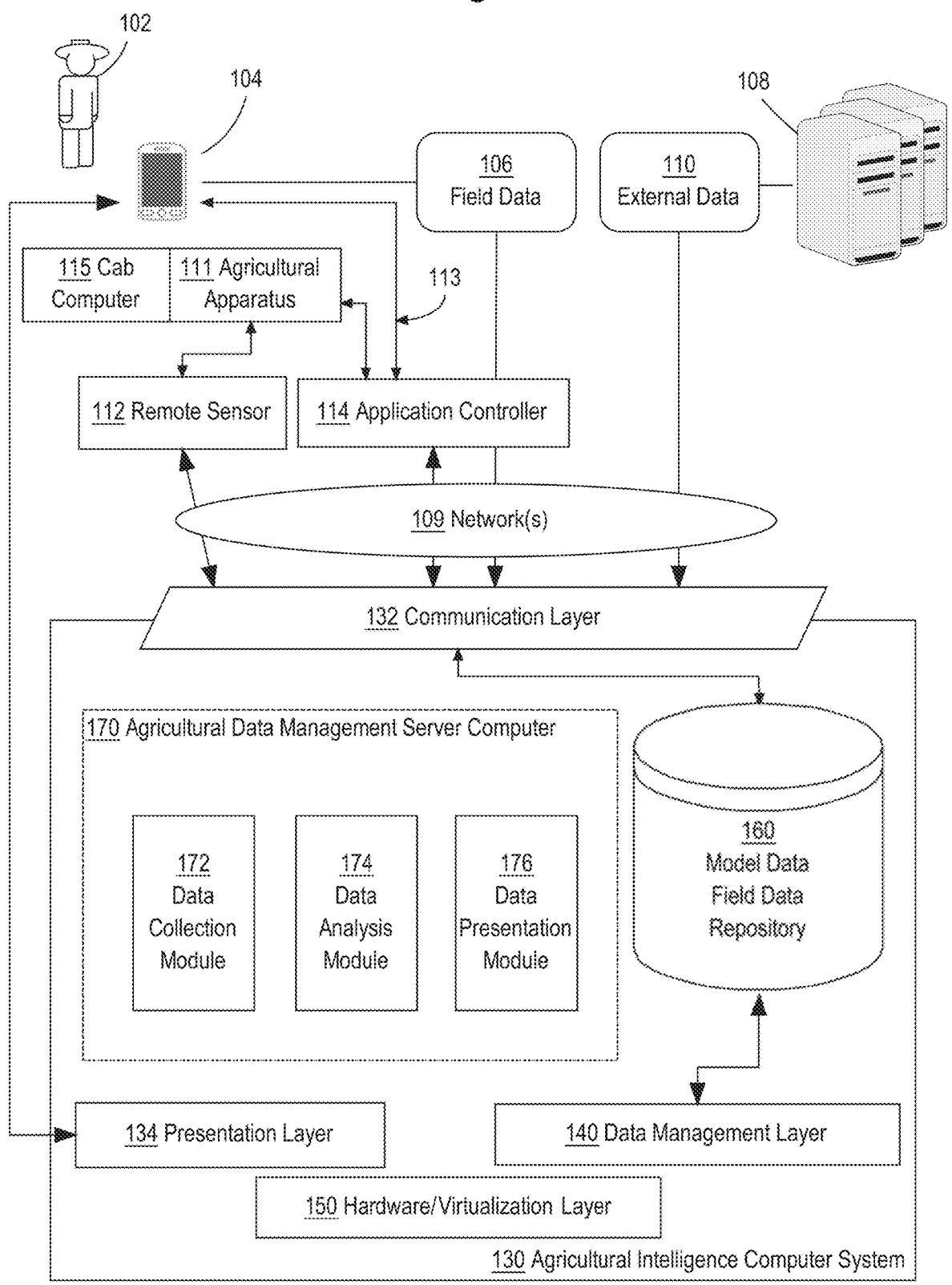
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:
1. GENERAL OVERVIEW
2. EXAMPLE AGRICULTURAL INTELLIGENCE COMPUTER SYSTEM
    2.1. STRUCTURAL OVERVIEW
    2.2. APPLICATION PROGRAM OVERVIEW
    2.3. DATA INGEST TO THE COMPUTER SYSTEM
    2.4. PROCESS OVERVIEW—AGRONOMIC MODEL TRAINING
    2.5. IMPLEMENTATION EXAMPLE—HARDWARE OVERVIEW
3. SYSTEM FOR DETERMINING PLACEMENT OF EXPERIMENTS, TREATMENTS OR APPLICATIONS
4. EXAMPLE METHOD OF DETERMINING CAUSAL RELATIONSHIPS OF SOIL TESTS AND CROP YIELD
5. EXAMPLE METHOD OF DETERMINING SITE-SPECIFIC N FERTILIZER RECOMMENDATION 1. General Overview In an embodiment, causal discovery algorithms in the field of machine learning (ML) are programmed to generate output graphs or networks having nodes and edges that identify causal relationships between management practices, soil measurements, and harvested yield. The relationships represented in such graphs may be used to develop causal-based ML models in computer programs for counterfactual learning of harvested yield under different treatments. Furthermore, the algorithms can test multiple hypotheses about the existence of causal relationships between these variables with respect to harvested yield across a plurality of different soil measurements and across time. With these techniques, an estimate can be formed of the right time to use the Pre-Sidedress Nitrate Test (PSNT) in the farming season. Furthermore, the techniques herein can lead to discovery of new relationships that may be used to enhance programmed crop process models, recommendation models and other computer-implemented models in smart agriculture.

In an embodiment, a dataset of historic soil metrics from fields is obtained, typically for many fields. A specified soil test is identified, such as the PSNT, and the datasets contain values of variables relevant to that test. The datasets are provided to a plurality of constraint-based algorithms that generate a directed acyclic graph. In an embodiment, Forward and Backward stages may be used. In the Forward stage, the variables are tested on conditional independencies and added to a conditioning set. In the Backward stage, the variables in the conditioning set are tested versus other variables in the conditioning set. The goal is to reduce the relationships of the variables by links in a network where the variables are the nodes. In this case, the variables may be management practices, soil measurements, and harvested yield. The last step is to produce the directionality of the links as the directionality differentiates between causes and effect pairs.

In an embodiment, a computer-implemented method provides in-season, site-specific nitrogen fertilizer application insights by combining information from models and measurements. In an embodiment, a system divides the task into several components, obtains different types of information from different models or measurement within each component and then integrates them to form the insights. In one implementation, components comprise in-season weather measurement, in-season soil measurement, a critical nitrate level prediction model, and a fertilizer efficiency multiplier estimation model.

The system is flexible. The method for each component is replaceable. The system is also robust. Both statistical models and processes models may be used. Statistical models are driven by empirical observation on the relationship among yield, measurement, nitrogen fertilizer rate and other variables. Process models are driven by known physical laws and principles. When data is plentiful, statistical models may be used more heavily. When some data are missing, interpolation can be based on either a processes model or a statistical model, or the processes models may be used exclusively.

In one embodiment, a computer-implemented method includes receiving digital field data from an agricultural field representing one or more parameters of the field, soil, or crops in the field; retrieving historical data for the same field from one or more field databases; training and/or applying machine learning models to the field data and the historical data to derive representations of causality of one or more agronomic processes pertaining to the field; receiving user input specifying an anomaly to address via treatment, application or experiment; automatically adjusting the treatment, application or experiment to create a modified treatment, application or experiment that is most likely to generate result data that is usable to train machine learning models in an optimal manner.

2. Example Agricultural Intelligence Computer System

2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
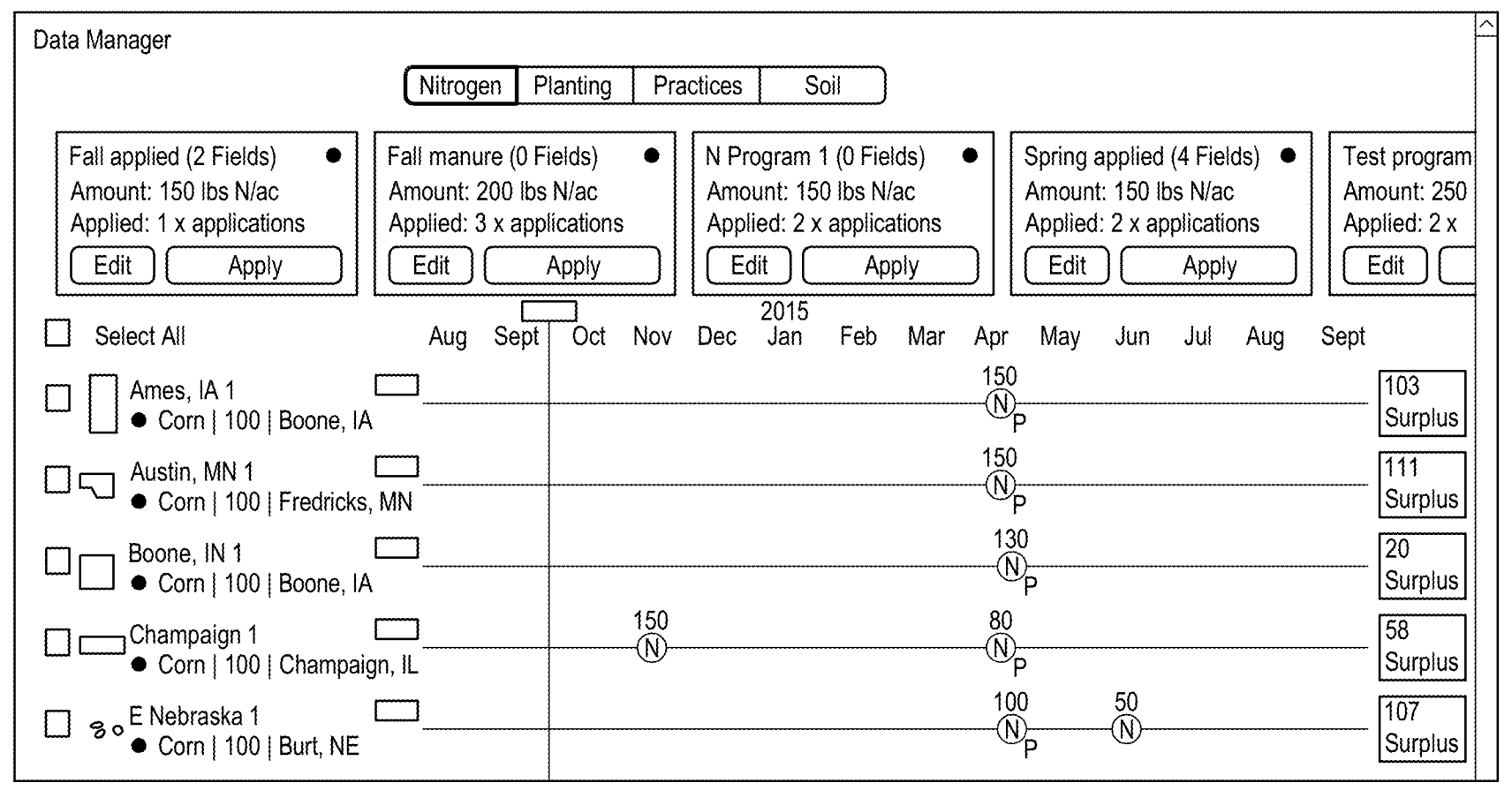

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, each of causal analysis instructions 136 and fertilizer recommendation instructions 138 comprises a set of one or more pages of main memory, such as RAM, in the agricultural intelligence computer system 130 into which executable instructions have been loaded and which when executed cause the agricultural intelligence computing system to perform the functions or operations that are described herein with reference to those modules. For example, causal analysis instructions 136 and fertilizer recommendation instructions 138 may comprise a set of pages in RAM that contain instructions which when executed cause performing the test causal analysis functions and fertilizer recommendation functions that are described herein in connection with FIG. 7A, FIG. 8, FIG. 9. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of causal analysis instructions 136 and fertilizer recommendation instructions 138 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computing system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
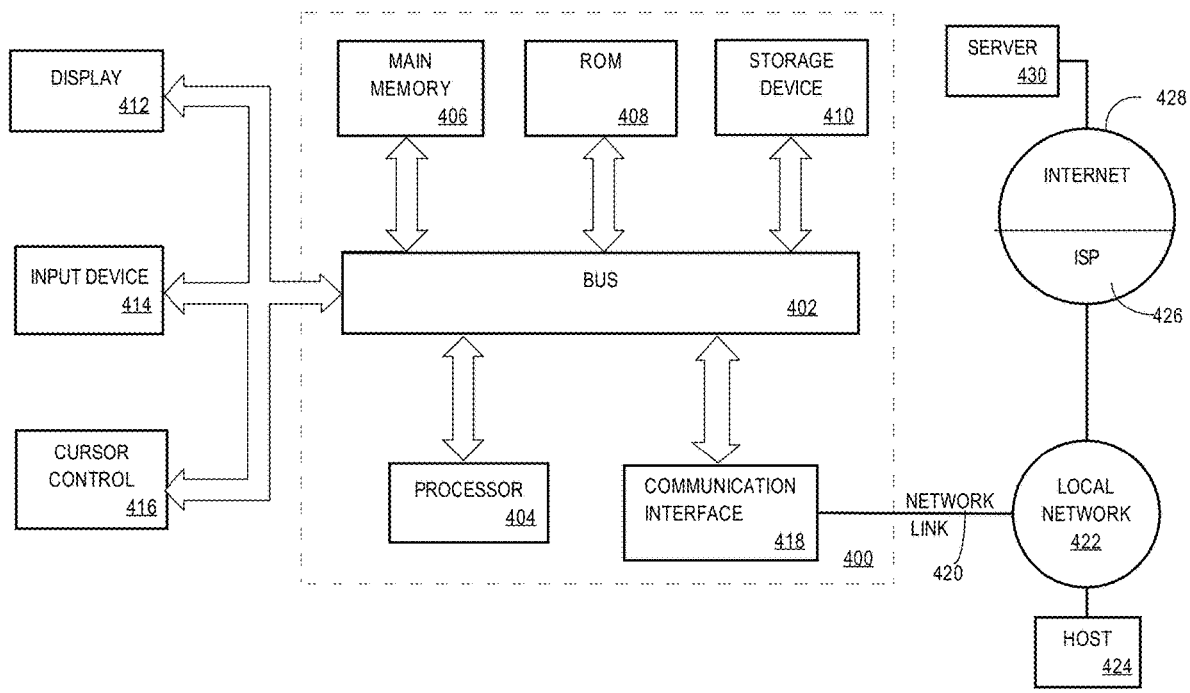
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4. Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
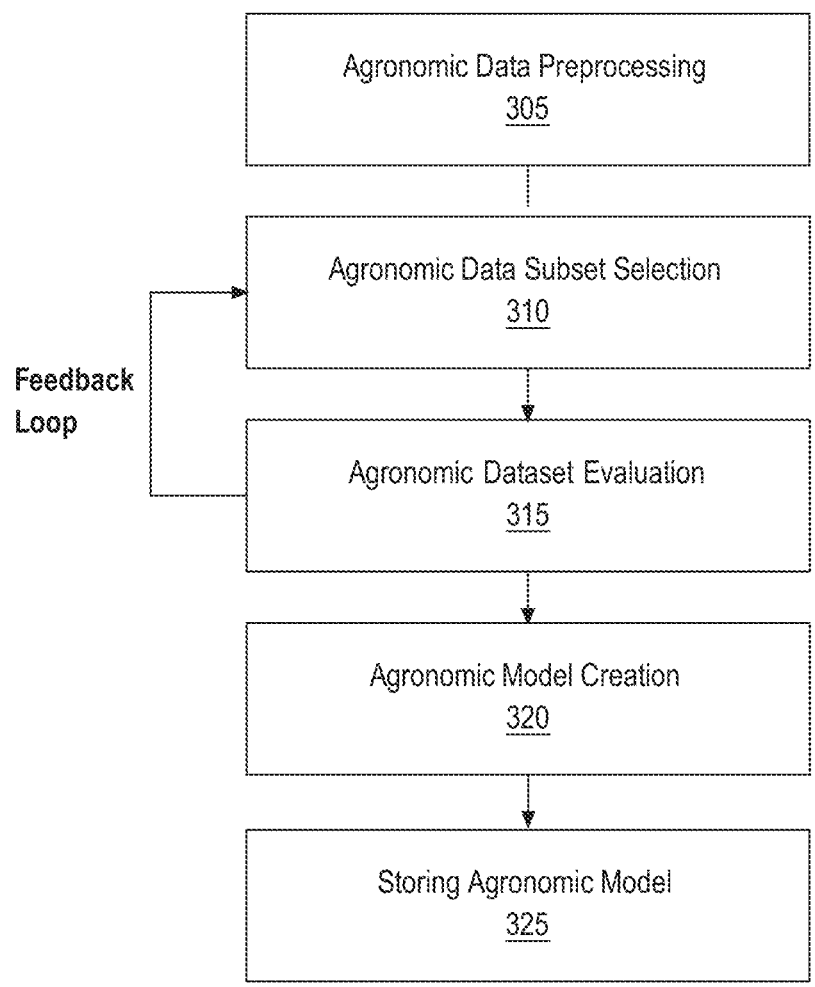
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world-wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. System of Determining Placements

FIG. 10 illustrates a process of determining the deployment of treatments, applications or experiments to provide response data that more effectively trains machine learning models. FIG. 10 broadly represents executable program steps that may be implemented for a data processing system for learning and updating algorithms applicable to agricultural applications, treatments or experiments. The process is optimized to act upon field data collected using in-field apparatus or remote sensing techniques, typically while an agricultural apparatus is carrying out an application in real time; applications could include seed, fertility, chemistry or others. The process is programmed to assist in designing new treatments, applications, experiments or other trials on the fly to result in collecting the best data that can be used for training and improving machine learning models. Embodiments may be based upon remote sensing techniques, on-equipment sensor-based techniques, in-field data and historical data. Embodiments may be programmed to compute how to generate new information for determining causal relationships among agricultural processes, and to adjust the treatments, applications or experiments to result in better data for improving the models. As one example, execution of an embodiment might occur in connection with in season application of fungicide; an embodiment could determine where the disease pressure is heaviest and recommend placing a treated/untreated check in that location to result in generating future data representing crop response to the treatment for use in training machine learning models.

At block 1002, the process is programmed to receive digital data from an agricultural field representing one or more parameters of the field, soil, or crops in the field, via collection using in-field machinery having sensors, remote sensors, or other digital data collection apparatus. Sensors may include any of those previously described in reference to FIG. 1 to FIG. 6 inclusive. For example, sensors mounted on tractors, planters, sprayers or other implements may generate digital data values by passing over soil or crops and sensing one or more agricultural parameters such as temperature, soil moisture, soil chemistry, plant phrenology, presence of disease and so forth.

At block 1004, the process is programmed to retrieve historical data for the same field. Historical data for fields may be retrieved programmatically using calls to the databases that have been previously described in reference to FIG. 1. Historical data typically would comprise digital data values for the same parameters that were collected at block 1002.

At block 1006, the process is programmed to train and/or apply machine learning models to the data that was collected or received at block 1002 and the historical data that was retrieved at block 1004 to derive representations of causality of one or more agronomic processes pertaining to the field. Section 4 of this disclosure describes one particular example method of determining causal relationships of soil test and crop yield, but other methods may be used.

At block 1008, the process is programmed to receive user input specifying an anomaly to address via treatment, application or experiment. For example, user input in a graphical user interface could specify a region of a field, or an anomaly such as a concentration of diseased crop, as the subject of a treatment, application or experiment. User input also may specify the particular treatment to be used, such as a fertility treatment, disease treatment or a comparative planting experiment using different hybrids.

At block 1010, the process is programmed to automatically adjust the treatment, application or experiment that was specified at block 1008, based upon the representations of causality that were derived at block 1006, to create a modified treatment, application or experiment that is most likely to generate result data that is usable to train machine learning models in an optimal manner. By this process, an application, treatment or experiment may be optimized to generate response data or result data from the field that is tied or related to the causality representations and therefore will better train machine learning models that explain causality or that recommend treatments, applications or experiments.

Optionally, the process may be programmed with a feedback loop to transfer control back to block 1002. In this manner, the process may be programmed to cause repeat collection or retrieval of data from the field for purposes of evaluation the effectiveness of the modified treatment, application or experiment. Furthermore, use of a feedback loop can involve the process in a continuous improvement methodology that allows the relevant machine learning models to continually improve. Embodiments can be used to determine what applications to make to a field in real time, involving seed, fertility, chemistry or other parameters, or to design trials on the fly to collect the best data for improving models. The process can compute how to generate new information for getting the causal relationships and then adjusting the applications to get better information for improving the models. As one specific example, the methods of this section could be applied to in-season application of fungicide. The process may be used to detect where disease pressure is heaviest on a crop, and to place a treated/untreated experiment in the field at a particular location to result in generating response data that is most likely to effectively train machine models for prediction of the same disease or the same plant pathology.

Thus, this section has disclosed a computer-implemented method comprising: receiving digital field data from an agricultural field representing one or more parameters of the field, soil, or crops in the field; retrieving historical data for the same field from one or more field databases; training and/or applying machine learning models to the field data and the historical data to derive representations of causality of one or more agronomic processes pertaining to the field; receiving user input specifying an anomaly to address via treatment, application or experiment; automatically adjusting the treatment, application or experiment to create a modified treatment, application or experiment that is most likely to generate result data that is usable to train machine learning models in an optimal manner. One particular embodiment of the method includes the digital field data representing fungal disease pressure on a crop in the field, the historical data indicating a region of the field in which the same fungal disease was previously observed, the user input specifying the fungal disease to address via a side-by-side experiment.

4. Example Method of Determining Causal Relationships of Soil Tests and Crop Yield FIG. 7A illustrates a method or an algorithm for determining causal relationships between specified soil tests and other data in crop development. FIG. 8 illustrates an example acyclic directed graph as possible output from using the method of FIG. 7A. Referring first to FIG. 7A, in an embodiment, at step 702, the process of FIG. 7A obtains a plurality of datasets for historical soil, application, weather and yield properties for a plurality of fields. For purposes of illustrating a clear example, FIG. 7A focuses on particular kinds of machine learning models. However, the broader process represented in FIG. 7A, such as block 704, 708, 710, may be implemented using other machine learning models.

In one experiment, datasets were obtained from 335 corn fields with soybean as the previous crop from five research farms in the Midwestern United States for 2015 to 2017. Soil measurements included pre-sidedress nitrate (denoted in FIG. 8 as no3.n.ppm), ammonium (nh4.n.ppm), organic matter (om.), cation exchange capacity (cec.cmol._kg), ph (ph.), and nitrogen fertilizer application amount before measurements (before.psnt.lb.n_acre). Weather data comprising a log of the cumulative precipitation amount for 45 days prior to measurements also was obtained. Data for the number of cumulative growing degree days between planting dates and measurement dates was used.

As seen at block 703, the datasets include values for certain metrics that have been measured or tested at different times with respect to planting, growth, fertilizer application times and levels, and/or other specified events or tests. An example of a specified test is the PSNT. Growers are often interested in studying how end-of-season crop yield responds to changes in soil nutrients measured during a growing season. If yield responds, growers can consider using the measurement of these soil nutrients to improve in-season fertilizer management. The pre-sidedress nitrate test (PSNT) may have utility for adjustment of the nitrogen sidedress recommendation in certain types of fields. A PSNT may have more or less association with yield, for example, depending upon how much nitrogen fertilizer is added before the PSNT is performed. Development of a sidedress recommendation process can benefit from study about when the end-of-season crop yield is associated with PSNT. It is also useful to identify the confounders in the PSNT-yield relationship because crop yield is the result of combined effects of soil nutrients, weather, and management.

Figure 8A:
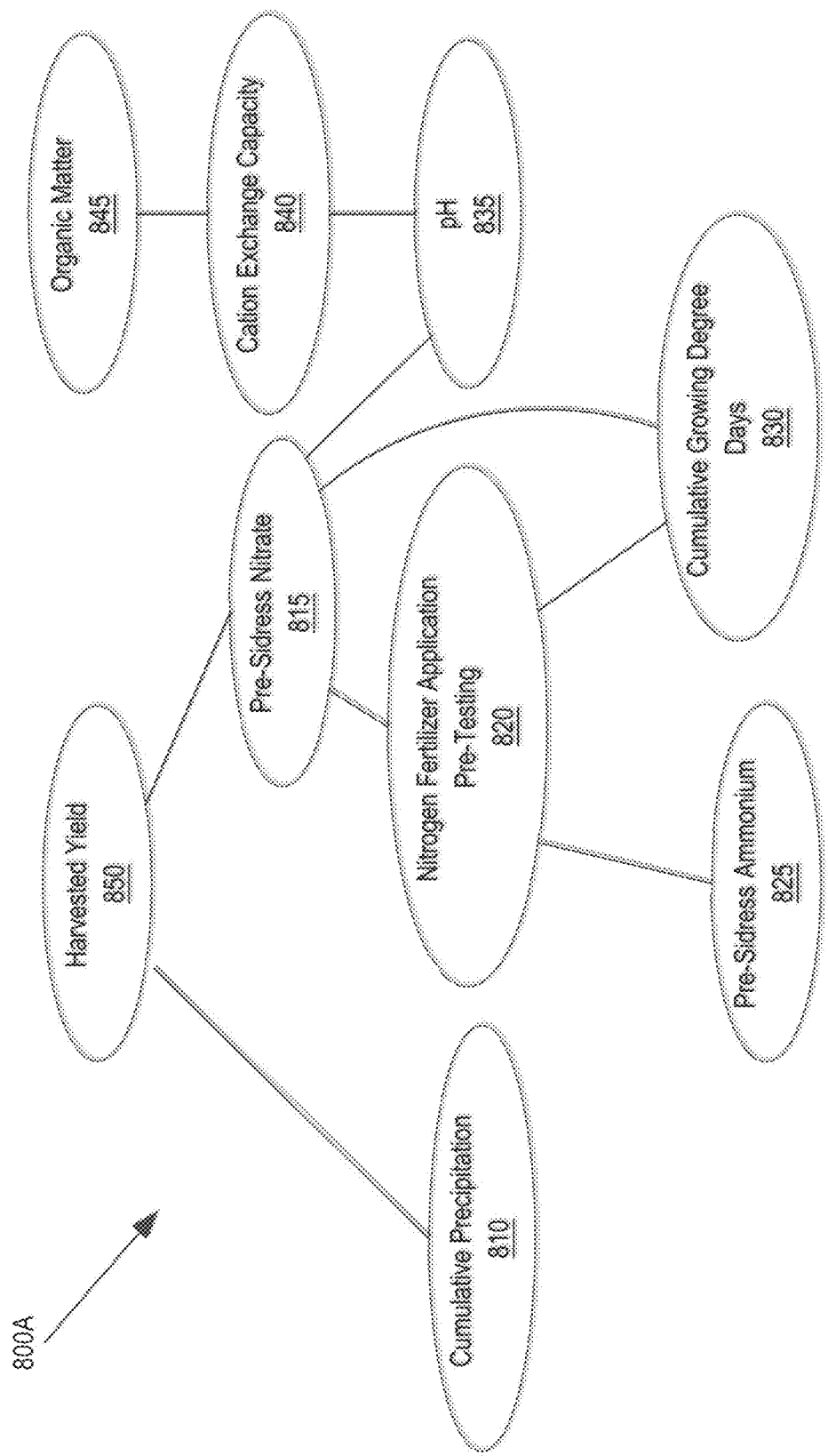
Figure 8C:
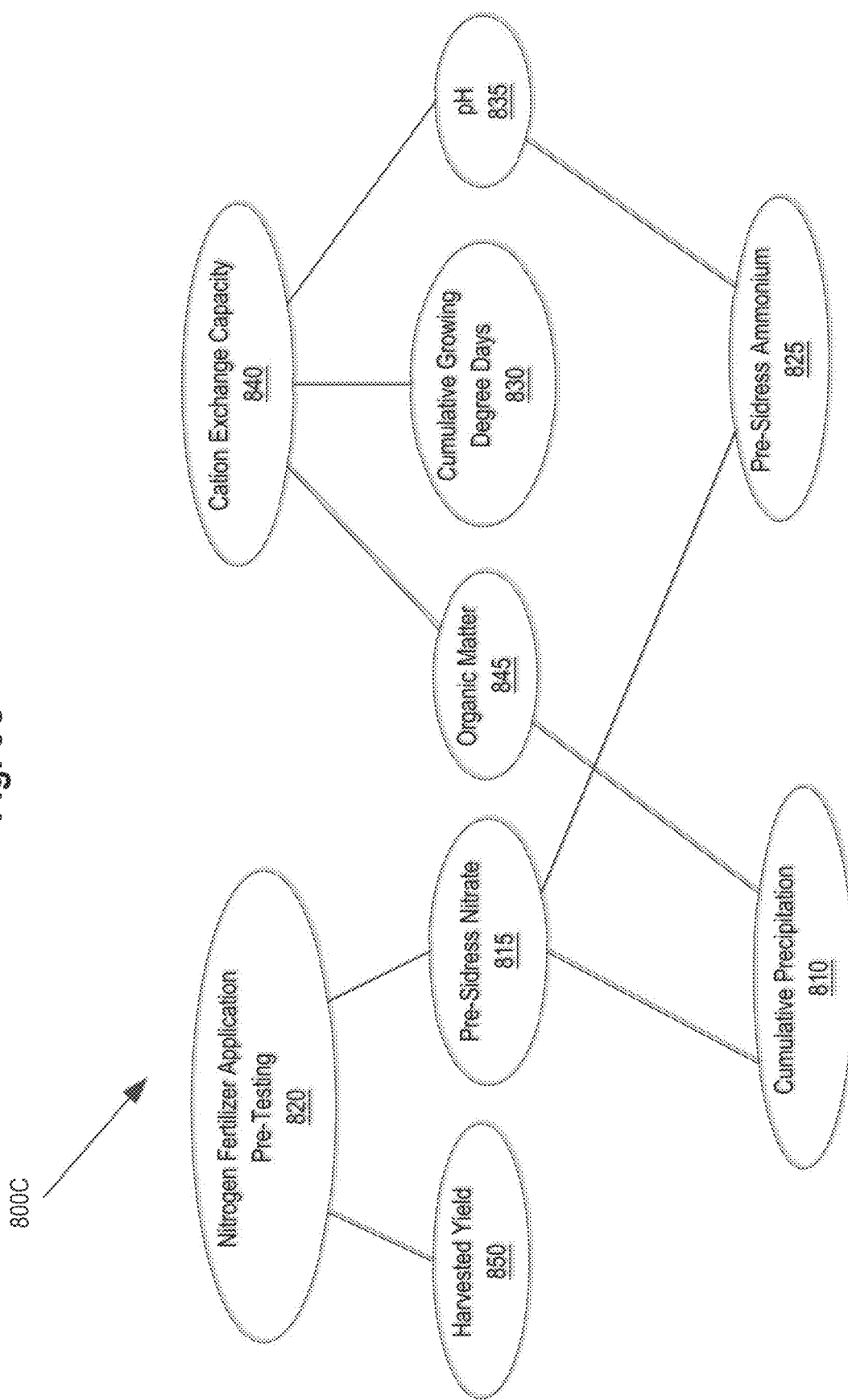

At step 704, the process applies a plurality of different constraint-based Causal Bayesian Network learning algorithms to the data. Causal discovery algorithms are an aspect of probabilistic graphical model structure learning algorithms. An output of this class of algorithms according to certain embodiments is a directed acyclic graph (DAG) such as shown in FIG. 8A, FIG. 8B, and FIG. 8C. These algorithms are configured to exhibit causal sufficiency, as the DAG represents relationships between variables that matter to each other and a particular outcome (e.g., yield). The DAG also represents causal interdependencies in the distribution of variables. The algorithms also provide causal faithfulness by representing conditional independencies. Examples of usable types of these algorithms include Grow-Shrink, Incremental Association Markov Blanket (IAMB), Fast IAMB and Interleaved IAMB.

As seen at block 706, the effect of step 704 is to determine the correct factorization of joint distribution of the measured variables via multiple conditional independence hypothesis tests within algorithms. The factorization problem may be expressed mathematically and programmed as:

$$P(X_1, X_2, \ldots, X_n) = \prod_{i=1}^{n} P(X_i \mid parents(X_i))$$

where P specifies a dataset having metrics, values or factors X1 to Xn. FIG. 7B illustrates data flow in applying the method of FIG. 7A. As seen in FIG. 7B, the effect of the method is to obtain a data sample 720, apply a plurality of independence tests 722 that determine, for example, if X2 is independent of X1, X3 and for other combinations, and yield a DAG 800 as output.

At step 708, the process receives the DAG as output. The DAG may be digitally stored in memory for analysis in other programmatic steps. FIG. 8A, FIG. 8B, and FIG. 8C are examples of output DAGs that may be received at this stage. Experimentation has shown that the nodes and edges in the DAG will vary depending upon when a specified test is performed among which FIG. 8A, FIG. 8B, and FIG. 8C are some examples among many that could be generated. The aforementioned datasets were entered as input to a computer program utilizing the statistical programming language R with the BNLearn module by Scutari (2010) programmed with the Interleaved IAMB algorithm. In these examples of DAGs, the inventors observed at least three (3) different important relationships, in terms of nodes and edges, depending on whether the amount of fertilizer application before performing the PSNT was <20 lb/acre (corresponding to FIG. 8A), 20-80 lb/acre (corresponding to FIG. 8B), or >80 lb/acre (corresponding to FIG. 8C).

As previously noted, block 704, 706, 708 are examples and other implementations do not need to use constraint-based Causal Bayesian Network learning algorithms. Grow-Shrink, Incremental Association Markov Blanket (IAMB), Fast IAMB and Interleaved IAMB could be used in some implementations, while score-based approaches and hybrids between constraint- and score-based approaches can also be used. Furthermore, other kinds of classifiers or neural networks could be programmed to implement the same functionality in slightly different ways. What is important is that a representation of causality in digital data can be derived from the data.

Referring further to FIG. 8A, FIG. 8B, and FIG. 8C, in an embodiment, DAGs 800A, 800B, and 800C comprise nodes respectively represented by the following reference labels (and R programmed variables):

- 850 (harvested.yield.bu_acre)—Harvested yield in units of bushels per acre
- 815 (no3.n.ppm)—pre-sidedress nitrate
- 825 (nh4.n.ppm)—pre-sidedress ammonium
- 845 (om._100)—organic matter
- 840 (cec.cmol._kg)—cation exchange capacity
- 835 (ph.)—pH
- 820 (before.psnt.lb.n_acre)—nitrogen fertilizer application amount before measurements
- 810 (log.cum.precip.45.days.prior.to.psnt.mm)—weather data comprising a log of the cumulative precipitation amount for 45 days prior to measurements
- 830 (cum.gdd.c.btw.planting.and.psnt)—cumulative growing degree days between planting dates and measurement dates Referring back to FIG. 7A, at step 710, based on the DAGs 800A, 800B, and 800C, the process determines a causal relationship of a specified test and yield or other metric. Determining a causal relationship may comprise identifying a node corresponding to yield, and walking the graph to reach nodes having an edge directly connected to the yield node. Those nodes represent conditions, values or metrics that contribute to realizing the yield. If one of the nodes linked to the yield nodes represents the specified test, then the specified test has a causal relationship to yield. In the experiments, the inventors observed:

1. When fertilizer application amount before PSNT is less than 20 lb/acre, then the PSNT is directly correlated with the harvested yield. Precipitation is a confounder.

2. When fertilizer application amount before PSNT is greater than 80 lb/acre, conditional on the fertilizer application amount the PSNT test does not provide additional information on yield.

3. PSNT is more useful in a low chemical fertilized field for in-season nitrogen management adjustment.

At step 712, the process generates and distributes one or more updated fertility models that incorporate the specified test. FIG. 9 illustrates an algorithm for computer-implemented recommendation of fertilizer application that can be established and used based upon FIG. 7A as a foundation.

In some embodiments, Causal Structure Learning may be performed with data samples of measured environmental variables. In some embodiments, the sign and strength of the causal relationship in the DAG is calculated and displayed. In some embodiments, the process of FIG. 7A may relax the causal sufficiency requirement.

5. Example Method of Determining Site-Specific N Fertilizer Recommendation

Figure 9A:
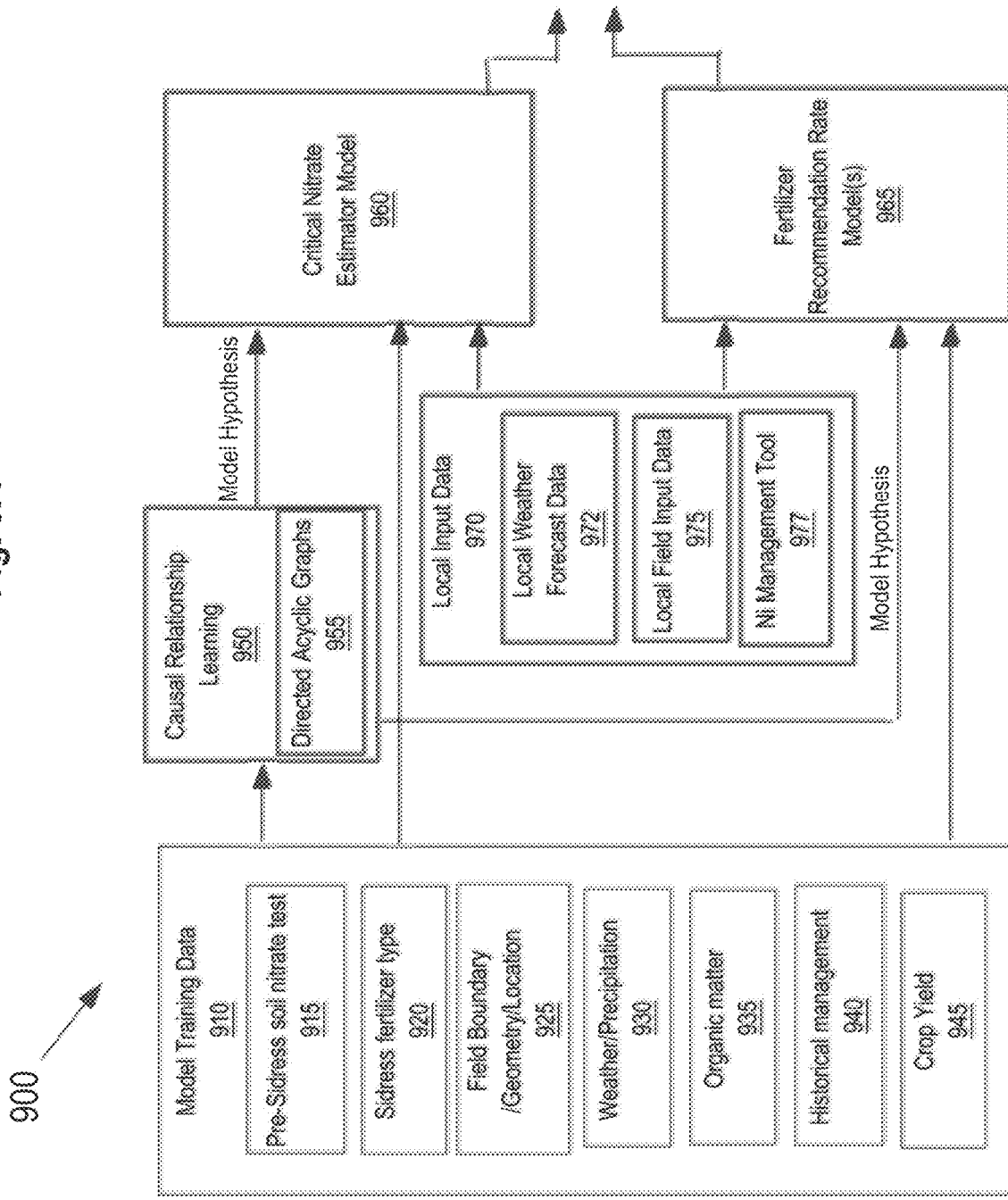
FIG. 9A illustrates computational components of an example system to provide site-specific N fertilizer sidedress application recommendations based on in-season measurement of soil nitrate and weather.

FIG. 9A illustrates computational components of an example system to provide site-specific N fertilizer sidedress application recommendations based on in-season measurement of soil nitrate and weather.

In an embodiment, a system 900 receives model training data 910 comprising a plurality of datasets. In some embodiments, the datasets may include results of pre-sidedress nitrate test (PSNT) measurements 915, sidedress fertilizer type values 920, location/field boundary/geometry values 925 in the form of lat-long values for example, weather/precipitation history 930 of the fields, OM values 935 indicating organic matter composition in the top foot of soil, historical management data 940, and measured crop yields 945. In an embodiment, model training data 910 is provided to a causal structure learning system 950 such as described above, a fertilizer recommendation rate model 965 and/or a critical nitrate estimation model 960

In an embodiment, the causal structure learning system 950 utilizes the datasets from training data 910 to generate one or more DAGs (or other form of relationship analytic) at 955 identifying the relationships between two or more of the parameters from the datasets with crop yields 945 and/or each other. Based upon the identified relationships, a model hypothesis about the relationship between parameters of the dataset and critical nitrate levels of an agricultural field can be used, along with datasets from 910, to help develop a critical nitrate level estimation model 960, a fertilizer recommendation rate model 965, and/or other models for making fertilizer recommendations for a particular agricultural field.

In embodiments, the critical nitrate level estimation model 960 and/or fertilizer recommendation rate model 965 are utilized to make a fertilizer/nitrogen sidedress recommendation at 980 for a particular agricultural field. The model(s) receive input data 970 regarding the particular agricultural field which can include local field input data 975 and local weather forecasts 972 (e.g., from a weather service connected via the Internet) for the particular field. Predicted precipitation is used in an embodiment to determine whether and to what extent a nitrogen fertilizer application will be helpful in optimizing crop yield. Historical precipitation data utilized as input to training the critical nitrate level estimation and fertilizer recommendation rate models can be used in embodiments to determine the correlation between the timing and amount of fertilizer application with forecasted precipitation.

In one embodiment, the fertilizer recommendation rate model 965 additionally receives input from a nitrogen management tool 977, which can also receive input from a weather service. An example nitrogen management tool interface is shown and described in reference to FIG. 5, for example but other forms of nitrogen management tools may be provided. Based on these data inputs, the fertilizer recommendation rate model 965 may be programmed to produce a recommendation of nitrogen side dress rate 914. Data from the nitrogen management tool 977 may be utilized in addition to or as a substitute for other input data received with respect to a particular field. For example, if PSNT has not been performed, then the nitrogen management tool 977 could provide an estimated substitute value.

In an embodiment, the critical nitrate level estimation model first makes a determination as to whether application of sidedress nitrate fertilizer is recommended for the particular field and the nitrogen fertilizer application model is further utilized to determine what level of sidedress fertilizer should be applied if application is recommended by the critical nitrate estimation model 960.

In some embodiments, one or more statistical models based on yield data may provide input to the critical nitrate level estimation model 960 and fertilizer recommendation rate model 965 for use in determining whether to apply fertilizer and/or also for generating the recommended rate of application at 960.

Within this system, there may also be ancillary models that suggest nitrate sampling locations and sample size recommendations for a given field as well as when we should consider using this measurement based system.

FIG. 9B illustrates a process of using the system of FIG. 9A to generate and implement fertilizer recommendation instructions 980. In some embodiments, use of the system of FIG. 9A may be supplemented by apparatus, stored digital data, and programmatic tools including the following:

1. A hand-held device to conduct in-field soil nitrate tests and shorten the period between a soil measurement and obtaining the test result.

2. A computer-implemented weather service that is programmed to compare in-season weather information up to PSNT to 30 years historical weather data and to perform probabilistic short-term forecasts up to a few weeks.

3. Data representing multiple years of harvested yield response to different PSNT levels and sidedress amounts across many fields in multiple states.

4. The Nitrogen Management Tool that is commercially available as part of Climate FieldView, from The Climate Corporation, San Francisco, US and implementing a physical and biochemical processes model that can simulate different scenarios of sidedress application.

In one embodiment, at step 922, the process receives basic information about a field. Example data may include the location, field boundary geometry, historical management information, and organic matter maps. This information is digitally stored in a database such as in the database shown and described in reference to FIG. 1.

In step 924, soil test result data is obtained. For example, a user may have conducted the PSNT test in the late spring in this field and uploaded soil test result data to the database. Alternatively, in-ground sensors could be installed pre-season or in-field test kits could be used; such sensors and test kits are widely available on a commercial basis.

At step 926, in an embodiment, fertilizer recommendation instructions 138 programmed to use the location information for the field to fetch site-specific blended weather time series data from a weather information web service. For example, public APIs of online weather services may be called to obtain a blended combination of historical observed data, short-term forecasts, and simulations on temperature and precipitation.

At step 928, in an embodiment, fertilizer recommendation instructions 980 are programmed and utilized to predict a season-specific and site-specific critical nitrate value based on the input data provided information about the field and the weather (e.g., input data received at 970 of FIG. 9) using a critical nitrate prediction model (e.g., critical nitrate estimator model of 960). The critical nitrate prediction model can be based on several existing models in the literature as previously described.

At step 930, fertilizer recommendation instructions 980 are programmed to estimate a multiplier that specifies what quantity each deficit of soil nitrate-N corresponds to what quantity of extra fertilizer should be added (in pounds per acre) given the short-term weather forecast received as input in step 922 for the specified location. In an embodiment, publicly available formulas for location-specific recommendations may be used. Alternatively, the Nitrogen Management Tool commercially available from The Climate Corporation, San Francisco, Calif., can simulate this process and estimate this multiplier.

At step 932, fertilizer recommendation instructions 980 are programmed to estimate a recommended nitrogen fertilizer amount to add to the field or portions thereof based on the information and determinations from steps 922, 924, 926, 928, and 930 including the result and timing of the pre-sidedress nitrate sample received at step 924, the critical nitrate value of the field determined at step 928, and the nitrate deficit multiplier determined at step 930.

In an embodiment, each component of system 900 is replaceable. Selected alternatives have been described for steps 922 to 932. Furthermore, in FIG. 9A, alternative approaches pertaining to causal relationship models, recommendation models, and nitrate estimation tools may be employed. For example, different implementations of system 900 may use different permutations of the specified data and models. Consequently, different implementations can consider statistical models, processes models, and measurements to implement substitute models when one type of model or measurement does not perform well.

Using these techniques, better N recommendation tools become available to growers. In past approaches, growers have had to use general guidance, usually locality- or state-specific sidedress N recommendations to calculate a sidedress amount when they decide to use the PSNT. An example is the Iowa State PSNT-based sidedress N recommendation model. It specifies that the sidedress rate shall be 0 if PSNT>=25 ppm for the top foot of soil, and that the rate should be (25−PSNT)*8 if PSTN<25 ppm for the top foot of soil. However, this guidance and especially the conversion factor of "8" is not tailored to the grower's field or even to the current season. Furthermore, based on the guidance, growers need to determine how and where to conduct pre-sidedress nitrate tests, query weather information on their own, decide which guidance they should follow, and then calculate the sidedress rate themselves; the decision-making procedure is complex.

With the techniques of this disclosure, the process becomes far more convenient, cost-saving, and accurate for growers. The conversion factor multiplier can be improved based on the relationships indicated by edges in a DAG that is produced via the method of FIG. 7A, which permit the conversion factor to vary based on management practices as well as weather. By leveraging management data and soil data that are uploaded to a database and weather service data, growers do not need to make the multiple decisions discussed above and programmed tools may issue recommendations and decisions automatically. Furthermore, in some embodiments, by using the Nitrogen Management Tool presently available from Climate, and a large amount of yield and soil data accessible to that tool, decision insights can be tailored for each unique field. Past techniques have suffered from a limited amount of data collected by each research institute located in separate states, but with the large amount of sample data across diverse geographic areas that is available in the Climate platform, the machine learning models described in this disclosure can produce more accurate results and lead to better recommendations.

It is believed that a significant number of fields will benefit from this measurement-based sidedress system, typically fields where pre-sidedress nitrate is hard to predict without a soil test. Examples include:

(1) Regions with high OM, such as >4% OM; additional N is added to soil from OM mineralization, while the unevenness of the mineralization rate from the OM could return different N levels, making the pre-sidedress nitrate level less predictable.

(2) Regions using manure or biosolid applications, as this application is less uniform in comparison with other N fertilization methods. The amount of N supplied by manure varies with the type of livestock, handling, rate applied, and method of application. Also, uneven amounts of OM are added in manure applications. Since the N form and content of manures varies widely, the use of PSNT test would help improve N management.

(3) Regions using cover crops and crop rotation with legumes such as alfalfa. In this scenario, an N credit is added to the soil when cover crops and crop rotation with legumes is used. Any portion of a legume crop that is left after harvest, including roots and nodules, can supply N to the soil system when the plant material is decomposed. The N credit takes time to transform into nitrate, and a PSNT will help the grower to learn about the nitrate level before the sidedress time.

(4) Regions that received excessive rain in spring. Use of PSNT can help estimate the loss of preplant fertilizer N application after heavy rainfall in spring Solving this problem not only meets a long-standing need for a solution to in-season nitrogen management but also it may encourage growers to utilize bio-fertilizers and crop rotations to manage nutrients on their farms. In the last century, in agriculture there was a trend that less diversified crop rotations were used, crop production was separated from animal enterprises and the manufactured N fertilizers were increased. Our focus on providing management solutions in fields with cover crops, high OM and manure may encourage growers to reconsider these bio-fertilizers sources.

What is claimed is:

1. A computer-implemented method comprising:
obtaining historical data pertaining to one or more agricultural fields, the historical data comprising harvested yields, pre-sidedress nitrate tests (PSNTs), and nitrogen fertilizer application amounts prior to a PSNT;
using a probabilistic model structure learning process implemented in computer program instructions with the historical data to determine one or more causal relationships between the harvested yields and the other historical data wherein a level of causal relationship between PSNTs, the nitrogen fertilizer application amount prior to a PSNT, and harvested yield is determined;

generating one or more calculation models implemented in computer program instructions wherein the models are based upon the historical data and the determined causal relationships;

receiving input data corresponding to a particular agricultural field, the input data comprising a weather forecast for the particular agricultural field;

based upon the one or more calculation models, calculating a recommended nitrogen fertilizer application amount for the particular agricultural field to be applied in advance of a time period corresponding to the weather forecast;

generating and displaying in a graphical user interface a report indicating the recommended nitrogen fertilizer application amount.

2. The computer implemented method of claim 1 wherein the probabilistic model structure learning process comprises a constraint-based Causal Bayesian Network process that generates a directed acyclic graph (DAG).

3. The computer implemented method of claim 2 wherein the Causal Bayesian Network process comprises factorizing the historical data as:

$$P(X_1, X_2, \ldots, X_n) = \prod_{i=1}^{n} P(X_i \mid parents(X_i))$$

wherein P represents the historical data as factors X1 to Xn.

4. The computer implemented method of claim 1 wherein the one or more calculation models comprises a critical nitrate estimator model which determines if nitrogen fertilizer application is recommended for the particular agricultural field, the one or more calculation models further comprising a sidedress rate recommendation model which determines a recommended amount of nitrogen fertilizer to sidedress the particular agricultural field with, the recommended amount of nitrogen fertilizer determined only when the critical nitrate estimator model recommends that nitrogen fertilizer should be added to the agricultural field.

5. The computer implemented method of claim 1 wherein the historical data pertaining to one or more agricultural fields further comprises organic matter levels, cation exchange capacity, cumulative precipitation, soil pH, and pre-sidedress ammonium.

6. The computer implemented method of claim 5 wherein the historical data pertaining to one or more agricultural fields further comprises a type of crop harvested during the prior growing season, prior levels of fertilizer applied, and one or more additional management practices pertaining to the one or more agricultural fields.

7. The computer implemented method of claim 5 wherein the historical data pertaining to one or more agricultural fields further comprises the depth and timing of one or more tests taken with respect to the historical data.

8. The computer implemented method of claim 5 wherein said input data pertaining to a particular agricultural field comprise a location, a field boundary, organic matter application, a pre-sidrss fertilizer type, and a PSNT of the particular agricultural field.

9. The computer implemented method of claim 8 wherein said input data pertaining to a particular agricultural field comprises cumulative levels of nitrogen fertilizer applied to the particular field prior to a PSNT of the particular agricultural field.

10. One or more non-transitory computer-readable media storing instructions which, when executed by one or more processors, cause:

obtaining historical data pertaining to one or more agricultural fields, the historical data comprising harvested yields, pre-sidedress nitrate tests (PSNTs), and nitrogen fertilizer application amounts prior to a PSNT;

using a probabilistic model structure learning process implemented in computer program instructions with the historical data to determine one or more causal relationships between the harvested yields and the other historical data wherein a level of causal relationship between PSNTs, the nitrogen fertilizer application amount prior to a PSNT, and harvested yield is determined;

generating one or more calculation models implemented in computer program instructions wherein the models are based upon the historical data and the determined causal relationships;

receiving input data corresponding to a particular agricultural field, the input data comprising a weather forecast for the particular agricultural field;

based upon the one or more calculation models, calculating a recommended nitrogen fertilizer application amount for the particular agricultural field to be applied in advance of a time period corresponding to the weather forecast;

generating and displaying in a graphical user interface a report indicating the recommended nitrogen fertilizer application amount.

11. The computer readable media of claim 10 wherein the probabilistic model structure learning process comprises a constraint-based Causal Bayesian Network process that generates a directed acyclic graph (DAG).

12. The computer readable media of claim 11 wherein the Causal Bayesian Network process comprises factorizing the historical metrics according to:

$$P(X_1, X_2, \ldots, X_n) = \prod_{i=1}^{n} P(X_i \mid parents(X_i))$$

wherein P represents the historical metrics as factors X1 to Xn.

13. The computer readable media of claim 10 wherein the one or more calculation models comprises a critical nitrate estimator model which determines if nitrogen fertilizer application is recommended for the particular agricultural field, the one or more calculation models further comprising a sidedress rate recommendation model which determines a recommended amount of nitrogen fertilizer to sidedress the particular agricultural field with, the recommended amount of nitrogen fertilizer determined only when the critical nitrate estimator model recommends that nitrogen fertilizer should be added to the agricultural field.

14. The computer readable media of claim 10 wherein the historical data pertaining to one or more agricultural fields further comprises organic matter levels, cation exchange capacity, cumulative precipitation, soil pH, and pre-sidedress ammonium.

15. The computer readable media of claim 10 wherein the historical data pertaining to one or more agricultural fields further comprises a type of crop harvested during the prior growing season, prior levels of fertilizer applied, and one or more additional management practices pertaining to the one or more agricultural fields.

16. The computer readable media of claim 10 wherein the historical data pertaining to one or more agricultural fields further comprises the depth and timing of one or more tests taken with respect to the historical data.

17. The computer readable media of claim 10 wherein said input data pertaining to a particular agricultural field comprise a location, a field boundary, organic matter application, a pre-sidress fertilizer type, and a PSNT of the particular agricultural field.

18. The computer readable media of claim 17 wherein said input data pertaining to a particular agricultural field comprises cumulative levels of nitrogen fertilizer applied to the particular field prior to a PSNT of the particular agricultural field.

19. A computer-implemented method comprising:
receiving digital field data from an agricultural field representing one or more parameters of the field, soil, or crops in the field;
retrieving historical data for the same field from one or more field databases; training and/or applying machine learning models to the field data and the historical data to derive representations of causality of one or more agronomic processes pertaining to the field;
receiving user input specifying an anomaly to address via treatment, application or experiment;
automatically adjusting the treatment, application or experiment to create a modified treatment, application or experiment that is most likely to generate result data that is usable to train machine learning models in an optimal manner.

20. The method of claim 19, the digital field data representing fungal disease pressure on a crop in the field, the historical data indicating a region of the field in which the same fungal disease was previously observed, the user input specifying the fungal disease to address via a side-by-side experiment.

* * * * *

UNITED STATES PATENT AND TRADEMARK OFFICE
CERTIFICATE OF CORRECTION

| | | |
|---|---|---|
| PATENT NO. | : 11,406,053 B1 | Page 1 of 1 |
| APPLICATION NO. | : 16/418634 | |
| DATED | : August 9, 2022 | |
| INVENTOR(S) | : Jie Hu and Carlos J. Carrion Madera | |

It is certified that error appears in the above-identified patent and that said Letters Patent is hereby corrected as shown below:

On the Title Page

Title, Line 1: replace "CASUAL" with -- CAUSAL DISCOVERY --

In the Specification

Column 1, Line 1: replace "CASUAL" with -- CAUSAL DISCOVERY --

Signed and Sealed this
Sixth Day of September, 2022

Katherine Kelly Vidal
*Director of the United States Patent and Trademark Office*